US012736082B2

(12) United States Patent
Lee et al.

(10) Patent No.: US 12,736,082 B2
(45) Date of Patent: Sep. 15, 2026

(54) LINEAR TRANSMISSION MODULE

(71) Applicant: TBI MOTION TECHNOLOGY CO., LTD., New Taipei City (TW)

(72) Inventors: Szu-Ying Lee, New Taipei City (TW); Kai-Ti Fan, New Taipei City (TW)

(73) Assignee: TBI MOTION TECHNOLOGY CO., LTD., New Taipei City (TW)

( * ) Notice: Subject to any disclaimer, the term of this patent is extended or adjusted under 35 U.S.C. 154(b) by 20 days.

(21) Appl. No.: 18/953,606

(22) Filed: Nov. 20, 2024

(65) Prior Publication Data

US 2026/0092626 A1 Apr. 2, 2026

(30) Foreign Application Priority Data

Sep. 27, 2024 (CN) ........................ 202422371377.X

(51) Int. Cl.
*F16C 29/08* (2006.01)
*F16C 29/06* (2006.01)
*F16C 43/04* (2006.01)

(52) U.S. Cl.
CPC ........ *F16C 29/088* (2013.01); *F16C 29/0609* (2013.01); *F16C 29/0633* (2013.01); *F16C 43/045* (2013.01); *F16C 29/065* (2013.01)

(58) Field of Classification Search
CPC .. F16C 29/06; F16C 29/0602; F16C 29/0609; F16C 29/0633–0666; F16C 29/08; F16C 29/084; F16C 29/088; F16C 43/045
See application file for complete search history.

(56) References Cited

U.S. PATENT DOCUMENTS

2003/0161557 A1 8/2003 Ishihara et al.
2006/0078236 A1* 4/2006 Lee .................... F16C 29/0611 384/45
2010/0139426 A1* 6/2010 Mori ...................... F16C 33/60 74/89.32

FOREIGN PATENT DOCUMENTS

CN 201696484 U 1/2011
CN 117287464 A 12/2023
DE 4311515 A1 10/1994
DE 4331014 A1 * 3/1995 ........... F16C 29/065
JP 2008215540 A 9/2008

(Continued)

OTHER PUBLICATIONS

Machine Translation of CN 201696484 (Year: 2011).*

*Primary Examiner* — Alan B Waits
(74) *Attorney, Agent, or Firm* — INNOVATION CAPITAL LAW GROUP, LLP; Vic Lin

(57) ABSTRACT

A linear transmission module is provided, including a slider body, two end caps, and two dustproof members. The two end caps are respectively arranged at two opposite ends of the slider body. Each of the end caps includes two assembly grooves extending through the end cap in a direction. The two dustproof members extend in a direction. One end of each of the dustproof members is assembled in an assembly groove of one of the end caps, and the other end of each of the dustproof members is assembled in an assembly groove of the other end cap. Each of the dustproof members includes a dustproof member body, a first contact portion, and a second contact portion. The first contact portion and the second contact portion are) respectively located on two opposite sides of the dustproof member body, protrude from the dustproof member body, and are in a symmetrical shape.

11 Claims, 6 Drawing Sheets

(56) References Cited

FOREIGN PATENT DOCUMENTS

| | | |
|---|---|---|
| JP | 4494601 B2 | 6/2010 |
| TW | I806551 B | 6/2023 |

* cited by examiner

LINEAR TRANSMISSION MODULE

CROSS-REFERENCE TO RELATED APPLICATION

This non-provisional application claims priority under 35 U.S.C. § 119(a) to patent application No. 202422371377.X filed in China, P.R.C. on Sep. 27, 2024, the entire contents of which are hereby incorporated by reference.

BACKGROUND

Technical Field

The present invention relates to a linear transmission module, and in particular, to a linear transmission module having a dustproof member.

Related Art

Generally, a linear transmission module is tightly attached to a slide rail through a dustproof strip made of a soft material such as rubber or plastic, to achieve effects of sealing and dustproofing. The dustproof strip is generally assembled by inserting the dustproof strip from an end cap at an upper end of a slider to an end cap at the other end in a length direction of the linear transmission module, or by pressing and assembling the dustproof strip onto the linear transmission module in a direction orthogonal to the length direction. However, a common dustproof strip has an asymmetric cross-sectional shape. Regardless of an assembly manner, the cross-sectional shape that is of the dustproof strip and that corresponds to an assembly groove needs to be first confirmed during assembly, to confirm an assembly direction. Therefore, assembly cannot be performed arbitrarily. In addition, due to the asymmetric cross-sectional shape, during manufacturing, for example, injection or pressing, parts are cooled and contracted to inconsistent degrees, resulting in difficulty in controlling processing precision. Further, due to the asymmetric cross-sectional shape of the dustproof strip, mold opening needs to be respectively performed for different cross-sectional shapes correspondingly, and difficulty of mold repair is high.

SUMMARY

In view of this, according to an embodiment, a linear transmission module is provided, including a slider body, two end caps, and at least two dustproof members. The slider body, where a length direction is set as a first direction, a width direction is set as a second direction, a thickness direction is set as a third direction, and the first direction, the second direction, and the third direction are perpendicular to each other. The two end caps, respectively arranged at two opposite ends of the slider body in the first direction, and each of the end caps includes at least two assembly grooves correspondingly arranged in the second direction. Each of the assembly grooves extends through the end cap in the first direction, and each of the assembly grooves includes an abutting surface, a clamping portion, and an assembly surface. The clamping portion is respectively connected to the abutting surface and the assembly surface, the abutting surface and the assembly surface are opposite surfaces, and a minimum distance between the abutting surface and the assembly surface in a fourth direction is smaller than a maximum distance of the clamping portion in the fourth direction. The at least two dustproof members extend in the first direction. One end of each of the dustproof members in the first direction is assembled in an assembly groove of one of the end caps. The other end of each of the dustproof members in the first direction is assembled in an assembly groove of the other end cap. Each of the dustproof member includes a dustproof member body, a first contact portion, and a second contact portion. The first contact portion and the second contact portion are respectively located on two opposite sides of the dustproof member body perpendicular to the first direction, protrude from the dustproof member body in the fourth direction of the dustproof member body, and are in a symmetrical shape.

In some embodiments, a through groove running through the first direction is included inside the end cap, the through groove includes two inner surfaces of the end cap in the second direction of the end cap, and the two assembly grooves are correspondingly provided on the two inner surfaces of the end cap.

In some embodiments, a rail groove running through the first direction is included inside the slider body, the rail groove includes two inner surfaces of the slider body in the second direction of the slider body, and forms an opening in the third direction. The slider body further includes two outer retainers, the two outer retainers are respectively arranged on the inner surfaces of the slider body and are adjacent to the opening, each of the outer retainers includes an accommodation groove running through in the first direction and corresponds to the assembly groove, and when two opposite ends of each of the dustproof members are respectively assembled in the assembly grooves of the two end caps, a part of each of the dustproof members is accommodated in a corresponding accommodation groove.

In some embodiments, at least two dustproof members are four dustproof members, and at least two assembly grooves are four assembly grooves. The slider body further includes an inner retainer arranged on a side that is opposite to the opening in the rail groove in the slider body. The inner retainer includes two support portions correspondingly arranged in the second direction, and each of the support portions extend in the first direction, the two assembly grooves correspond to the two support portions and are arranged on the end caps. When two opposite ends of two of the dustproof members are respectively assembled in the assembly grooves corresponding to the support portions on the two end caps, the first contact portions of the two dustproof members respectively abut against the support portions, and when two opposite ends of the other two dustproof members are respectively assembled in the assembly grooves on the two end caps corresponding to the accommodation grooves, the first contact portions of the other two dustproof members are respectively correspondingly accommodated in the accommodation grooves.

In some embodiments, a rail groove running through the first direction is included inside the slider body, the rail groove includes two inner surfaces of the slider body in the second direction of the slider body, and forms an opening in the third direction. The slider body further includes an inner retainer arranged on a side that is away from the opening in the rail groove of the slider body, the inner retainer includes two support portions correspondingly arranged in the second direction, each of the support portions extends in the first direction, and when two opposite ends of each of the dustproof members are respectively assembled in the assembly grooves of the two end caps, the first contact portion abuts against the support portion.

In some embodiments, each of the support portions continuously extends from a side of one of the end caps to a side of the other end cap.

In some embodiments, each of the support portions extend from a side of one of the end caps to a side of the other end cap at a plurality of intervals.

In some embodiments, when the dustproof member is assembled in the assembly groove, the first contact portion is accommodated in the clamping portion, the dustproof member body abuts against the abutting surface, and the second contact portion is exposed from the assembly groove.

In some embodiments, a dimension of the dustproof member body in the fourth direction is smaller than the minimum distance between the abutting surface of the assembly groove and the assembly surface in the fourth direction.

In some embodiments, a dimension of the dustproof member body in the fourth direction is equal to the minimum distance between the abutting surface of the assembly groove and the assembly surface in the fourth direction.

In some embodiments, the assembly surface of the assembly groove protrudes toward the abutting surface and abuts against the dustproof member body of the dustproof member.

In some embodiments, the two assembly grooves are arranged on an outer surface of the end cap in the second direction.

In some embodiments, hardness of the dustproof member body of each of the dustproof members is greater than hardness of the first contact portion and hardness of the second contact portion.

In some embodiments, cross sections of the first contact portion and the second contact portion may be circular, elliptical, triangular, rectangular, or other similar shapes.

In summary, according to an embodiment of this application, a linear transmission module is provided. Two opposite sides of a dustproof member include a first contact portion and a second contact portion with symmetrical shapes. When the dustproof member is assembled to a corresponding assembly groove on an end cap, the dustproof member may be fixed in the assembly groove through one of the contact portions, and abuts against an external element with the other of the contact portions to close a gap, so that assembly and dustproof effects are simultaneously achieved. Further, because the first contact portion and the second contact portion are in the symmetrical shape, assembly and dustproof can be performed regardless of whether the first contact portion or the second contact portion is used. For example, when the first contact portion is used as an assembly structure, the second contact portion may be used as a dustproof structure, and when the first contact portion is used as the dustproof structure, the second contact portion may be used as the assembly structure. In other words, the first contact portion or the second contact portion has both assembly and dustproof functions. In addition, because the first contact portion and the second contact portion are symmetrical in shape, it is more convenient for a user to assemble, and the dustproof member is also easier to manufacture. Moreover, as use time increases, one of the two contact portions may be worn. In this case, the dustproof member may be extracted, and the other contact portion that is not worn may be used for assembly again, to reduce a replacement rate of the dustproof member, thereby achieving environmental protection and waste reduction.

DETAILED DESCRIPTION

Figure 1:
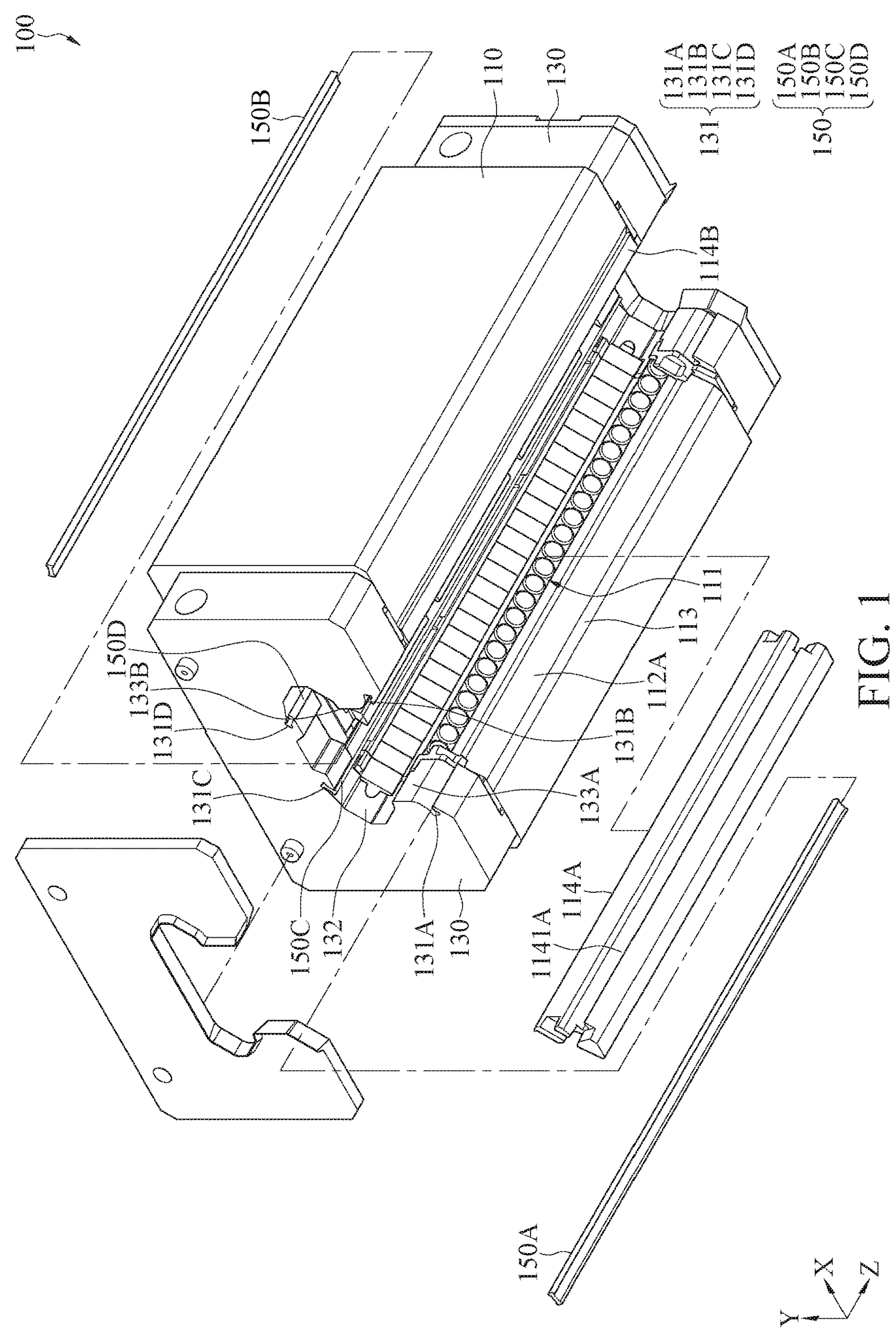
FIG. 1 is a three-dimensional diagram of a linear transmission module according to a first embodiment.
Figure 2:
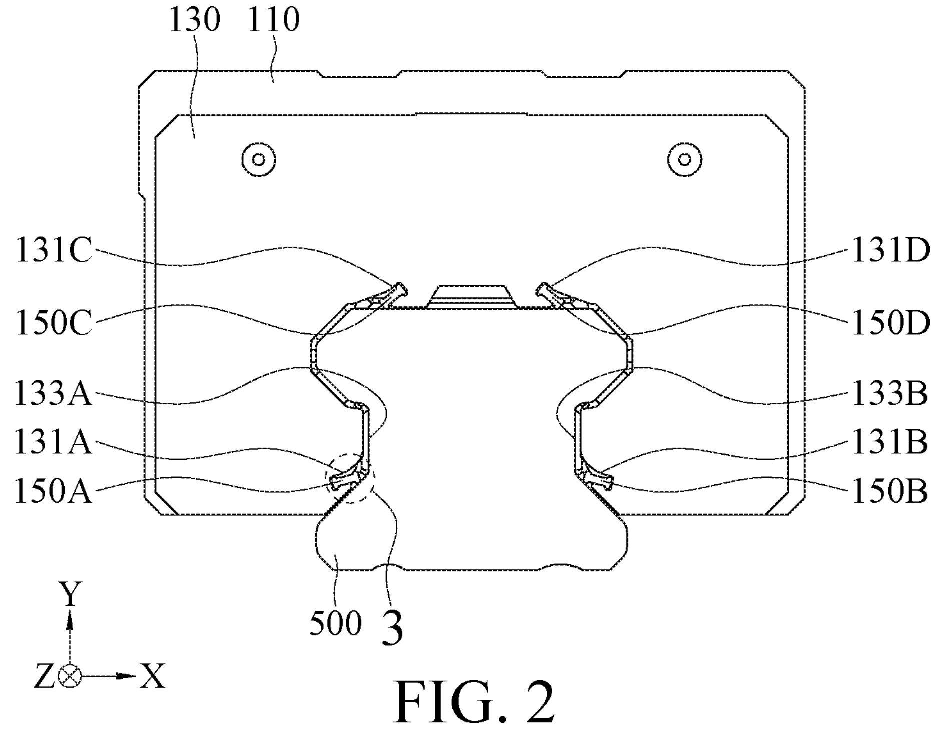
FIG. 2 is a front view of a linear transmission module used in a slide rail according to a first embodiment.
Figure 3:
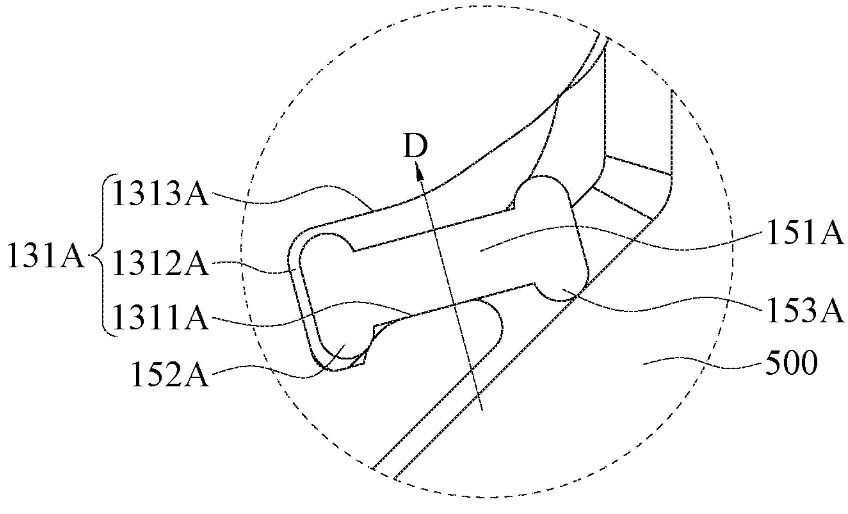
FIG. 3 is a partially enlarged view of the linear transmission module in FIG. 2.
Figure 4:
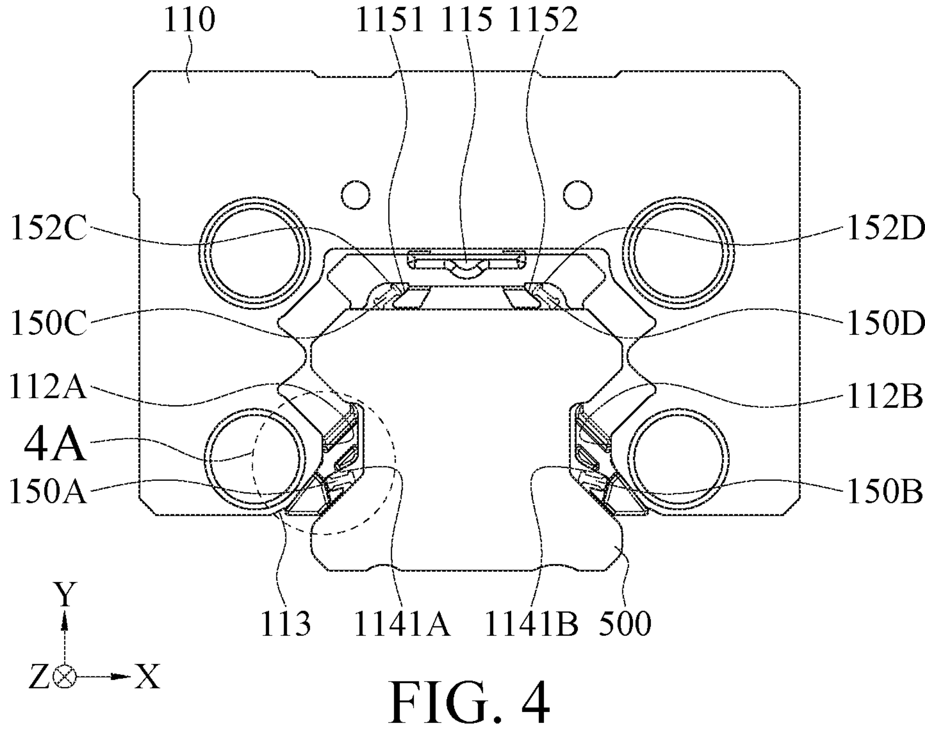
FIG. 4 is a front view of a linear transmission module used in a slide rail according to a first embodiment.

Refer to FIG. 1 to FIG. 4. FIG. 1 is a three-dimensional diagram of a linear transmission module according to a first embodiment. FIG. 2 is a front view of a linear transmission module used in a slide rail according to a first embodiment. FIG. 3 is a partially enlarged view of the linear transmission module in FIG. 2. FIG. 4 is a front view of a linear transmission module used in a slide rail according to a first embodiment. A linear transmission module 100 is provided, including a slider body 110, two end caps 130, and at least two dustproof members 150.

For ease of subsequent description, a direction extending in a length direction of the slider body 110 is set as a first direction Z (that is, a Z-axis direction in FIG. 1), a direction extending in a width direction of the slider body 110 is set as a second direction X (that is, an X-axis direction in FIG. 1), and a direction extending in a thickness direction of the slider body 110 is set as a third direction Y (that is, a Y-axis direction in FIG. 1). The first direction Z, the second direction X, and the third direction Y are perpendicular to each other.

The two end caps 130 are respectively arranged at two opposite ends of the slider body 110 in the first direction Z. The two end caps 130 have the same structure. Therefore, only one of the end caps 130 is used for description. In this embodiment, as shown in FIG. 1, the end cap 130 is described by using four assembly grooves 131 as an example. During actual application, the end cap 130 may alternatively be provided with only the assembly grooves 131 located on lower left and right sides, to provide the most basic dustproof effect. The two assembly grooves 131 located on the lower left and right sides are respectively described as assembly grooves 131A and 131B below (as shown in FIG. 2), and the two assembly grooves 131A and 131B are correspondingly arranged in the second direction X. The two assembly grooves 131A and 131B are located on two opposite sides and have the same structure. The assembly groove 131A on the left side in FIG. 2 is used for description below. It can be learned from FIG. 1 to FIG. 3 that the assembly groove 131A extends through the end cap 130 in the first direction Z. It can be learned from FIG. 3 that the assembly groove 131A includes an abutting surface 1311A, a clamping portion 1312A, and an assembly surface 1313A. The clamping portion 1312A is respectively connected to the abutting surface 1311A and the assembly surface 1313A, and the abutting surface 1311A and the assembly surface 1313A are opposite surfaces. As shown in FIG. 3, a minimum distance between the abutting surface 1311A and the assembly surface 1313A in a fourth direction D is smaller than a maximum distance of the clamping portion 1312A in the fourth direction D. In this way, assembly of the following dustproof member 150 is facilitated. An assembly structure is described in detail below. In this embodiment, the fourth direction D is a direction perpendicular to the abutting surface 1311A.

Refer to FIG. 1 to FIG. 3 again. In this embodiment, one dustproof member 150 is respectively arranged in each of the four assembly grooves 131, so that there are a total of four dustproof members 150. As described above, if only the two assembly grooves 131A and 131B located at the lower sides are provided, only two dustproof members 150 corresponding to the two assembly grooves 131A and 131B need to be provided. Herein, the two dustproof members 150 arranged in the two assembly grooves 131A and 131B are respectively described as dustproof members 150A and 150B below. The two dustproof members 150A and 150B extend in the first direction Z. The two dustproof members 150A and 150B have a same structure. One of the dustproof members 150A is described below. One end of the dustproof member 150A in the first direction Z is assembled in the assembly groove 131A of one end cap 130, and the other end of the dustproof member 150A in the first direction Z is assembled in the assembly groove 131A of the other end cap 130. A method for assembling the dustproof member 150 is as follows. For example, the dustproof member 150A may be inserted from the end cap 130 at one end of the slider body 110 to the end cap 130 at the other end in the first direction Z, so that two ends of the dustproof member 150A in the first direction Z are respectively accommodated in the assembly grooves 131A of the two end caps 130. Alternatively, two ends of the dustproof member 150A in the first direction Z may be grasped, and the dustproof member 150A is pushed toward the two assembly grooves 131A in a direction orthogonal to the first direction Z, so that the two ends of the dustproof member 150A are buckled into the two assembly grooves 131A. Further, as shown in FIG. 1 to FIG. 3, the dustproof member 150A includes a dustproof member body 151A, a first contact portion 152A, and a second contact portion 153A. The first contact portion 152A and the second contact portion 153A are respectively located on two opposite sides of the dustproof member body 151A that are perpendicular to the first direction Z, protrude from the dustproof member body 151A in the fourth direction D of the dustproof member body 151A, and are in a symmetrical shape.

In this way, when the first contact portion 152A is assembled in the assembly groove 131A, the second contact portion 153A protrudes from the assembly groove 131A and abuts against an external element (for example, a slide rail 500 shown in FIG. 2), thereby preventing dust or impurities from entering through a gap between the slider body 110 and the slide rail 500 or a gap between the end cap 130 and the slide rail 500 and affecting movement of the slider body 110 on the slide rail 500. In addition, as the linear transmission module 100 moves along the slide rail 500, the second contact portion 153A continuously and tightly abuts against the slide rail 500, and continuously closes the gap to isolate inner space and outer space, so that a dustproof effect is achieved.

In addition, the first contact portion 152A and the second contact portion 153A that are in the symmetrical shape are formed in the dustproof member 150A of the linear transmission module 100. A user may assemble any contact portion into the assembly groove 131A. When the dustproof members 150A and 150B are assembled to the corresponding assembly grooves 131A and 131B on the two end caps 130, the dustproof members may be fixed in the assembly grooves 131A and 131B through one of the contact portions. In this way, assembly and the dustproof effect are integrated through the dustproof member 150A, the first contact portion 152A is used for assembly, and the second contact portion 153A is used to abut against the external element to close the gap. Alternatively, if the second contact portion 153A is used for assembly, the first contact portion 152A may be used to abut against the external element to close the gap. That is, each of structures of the first contact portion 152A and the second contact portion 153A may be used as a dustproof structure or the assembly structure. In addition, through the symmetrical first contact portion 152A and second contact portion 153A of the dustproof member 150A, it is more convenient for the user to assemble without paying special attention to an assembly direction during assembly, a speed during assembly may be increased, an error possibility may be reduced, and manufacturing of the dustproof members 150A and 150B is easier. In addition, as use time increases, one of the first contact portion 152A and the second contact portion 153A may be worn. In this case, the dustproof member 150A may be drawn out, and the other contact portion that is not worn may be used for assembly again, to reduce a replacement rate of the dustproof member 150A, thereby achieving effects of environmental protection and waste reduction.

In addition, in this embodiment, hardness of the dustproof member body 151A is greater than hardness of the first contact portion 152A and hardness of the second contact portion 153A. For example, the dustproof member body 151A is made of, for example, metal or a high polymer, and the first contact portion 152A and the second contact portion 153A are made of, for example, a high polymer. In this embodiment, the high polymer is, for example, plastic or rubber. In this way, the first contact portion 152A and the second contact portion 153A are kept relatively deformable while a structural strength is enhanced. In this way, when the contact portion abuts against the slide rail 500, the contact portion can tightly contact the slide rail 500 because the contact portion deforms due to flexibility, to close the gap.

For the assembly of the dustproof member 150A, refer to FIG. 1 to FIG. 3. In this embodiment, an example in which the first contact portion 152A is assembled is used for description. Similarly, because the two end caps 130 have the same structure, the end cap 130 on one end is used as an example, and the end cap 130 on the other end is not described again. When the dustproof member 150A passes through in the first direction Z to be accommodated in the assembly groove 131A or is inserted into the assembly groove 131A by force through the opening between the abutting surface 1311A and the assembly surface 1313A, until two ends of the dustproof member 150A in the first direction Z are respectively assembled in the assembly grooves 131A of the two end caps 130, the first contact portion 152A is accommodated in the clamping portion 1312A, the dustproof member body 151A abuts against the abutting surface 1311A, and the second contact portion

153A is exposed from the assembly groove 131A. As shown in FIG. 3, because the minimum distance between the abutting surface 1311A and the assembly surface 1313A in the fourth direction D is smaller than the maximum distance of the clamping portion 1312A in the fourth direction D, if a dimension of the first contact portion 152A is larger than the minimum distance between the abutting surface 1311A and the assembly surface 1313A in the fourth direction D, but smaller than the maximum distance of the clamping portion 1312A in the fourth direction D, the first contact portion 152A is stopped by the abutting surface 1311A and the assembly surface 1313A and cannot pass through without receiving force from a proper direction, thereby preventing the first contact portion 152A from falling off from the clamping portion 1312A. In addition, the second contact portion 153A exposed from the assembly groove 131A continuously abuts against the slide rail 500, to close a gap between the slide rail 500 and the linear transmission module 100. In addition, in this embodiment, the dimension of the dustproof member body 151A in the fourth direction D is smaller than the minimum distance between the abutting surface 1311A and the assembly surface 1313A in the fourth direction D. When the second contact portion 153A abuts against the slide rail 500, the second contact portion 153A may deform or move toward a side of the assembly surface 1313A in FIG. 3. In this way, space for the second contact portion 153A to move can be reserved, and actuation of the linear transmission module 100 is not affected by excessively large sliding resistance between the second contact portion 153A and the slide rail 500 that is caused because the second contact portion 153A excessively tightly abuts against the slide rail 500 if a tolerance is excessively large during manufacturing of the dustproof member 150A.

Refer to FIG. 1 and FIG. 2 again. In this embodiment, a through groove 132 running through the first direction Z is included inside the end cap 130. The through groove 132 includes two inner surfaces 133A and 133B of the end cap in the second direction X of the end cap 130, the two inner surfaces 133A and 133B of the end cap are opposite surfaces, and the two assembly grooves 131A and 131B are correspondingly arranged on the two inner surfaces 133A and 133B of the end cap.

Figure 4A:
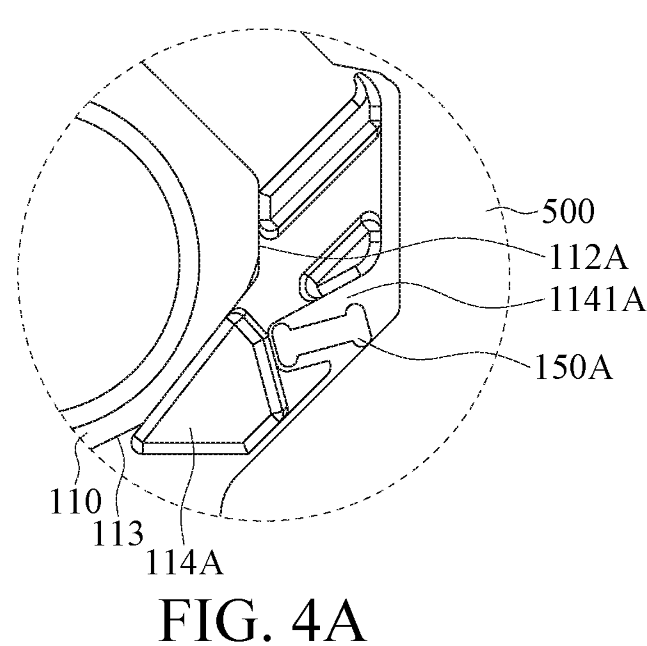
FIG. 4A is a partially enlarged view of the linear transmission module in FIG. 4.

Referring to FIG. 1 and FIG. 2, in this embodiment, a rail groove 111 running through the first direction Z is provided inside the slider body 110. The rail groove 111 includes two inner surfaces 112A and 112B of the slider body in the second direction X of the slider body 110, and forms an opening 113 in the third direction Y. The slider body 110 further includes two outer retainers 114A and 114B, and the two outer retainers 114A and 114B are respectively arranged on the inner surfaces 112A and 112B of the slider body and are adjacent to the opening 113. The outer retainers 114A and 114B include accommodation grooves 1141A and 1141B running through in the first direction Z and corresponding to the assembly groove 131A and 131B. It can be learned from FIG. 1 and FIG. 4 that the accommodation grooves 1141A and 1141B are respectively located on outer surfaces of the outer retainers 114A and 114B facing the rail groove 111. In this embodiment, because the two outer retainers 114A and 114B have a same structure and arranged symmetrically, one of the outer retainers 114A is described below. For further clarity, an enlarged view of the structure of the outer retainer 114A is provided in FIG. 4A. When two opposite ends of the dustproof member 150A in the first direction Z are respectively assembled in the assembly grooves 131A of the two end caps 130, the first contact portion 152A in a middle section of the dustproof member 150A in the first direction Z abuts against the corresponding accommodation groove 1141A. In this way, the outer retainer 114A provides additional support for the dustproof member 150A, so that it prevents the middle section of the dustproof member 150A from sagging due to gravity and affecting the contact with the slide rail 500 between the dustproof member 150A and the sliding between the slider body 110 and the slide rail 500.

In this embodiment, the dustproof member 150A is assembled in the assembly groove 131A adjacent to the opening 113, and the dustproof member 150B is assembled in the assembly groove 131B adjacent to the opening 113. In this way, dust or foreign matter can be prevented from entering the slide rail 500, but this is not limited thereto. As described above, in this embodiment, there are four dustproof members 150, which are respectively described as dustproof members 150A, 150B, 150C, and 150D below. There are also four assembly grooves 131 on the end cap 130, which are respectively described as assembly grooves 131A, 131B, 131C, and 131D below. The assembly of the dustproof members 150A and 150B and the assembly of the assembly grooves 131A and 131B are not described again.

In this embodiment, it can be learned from FIG. 2 that the assembly grooves 131C and 131D are located at an end away from the opening 113 relative to the assembly grooves 131A and 131B. It can be learned from FIG. 1 together with FIG. 4 that the slider body 110 further includes an inner retainer 115 arranged on a side of the rail groove 111 of the slider body 110 opposite to the opening 113. The inner retainer 115 includes two support portions 1151 and 1152 that are correspondingly arranged in the second direction X, and the support portions 1151 and 1152 extend in the first direction Z. Two assembly grooves 131C and 131D are arranged corresponding to the two support portions 1151 and 1152. When two opposite ends of the dustproof member 150C in the first direction Z are respectively assembled in the assembly groove 131C of the two end caps 130 corresponding to the support portion 1151, the first contact portion 152C of the dustproof member 150C abuts against the support portion 1151. When two opposite ends of the dustproof member 150D in the first direction Z are respectively assembled in the assembly grooves 131D of the two end caps 130 corresponding to the support portion 1152, the first contact portion 152D of the dustproof member 150D abuts against the support portion 1152. In this way, the dustproof members 150C and 150D are arranged on opposite inner sides of the opening 113 to further enhance the dustproof effect, and additional support is provided for the dustproof members 150C and 150D through the inner retainer 115, so that it prevents the middle section of the dustproof members 150C, 150D from sagging due to gravity and affecting the contact with the slide rail 500 between the dustproof members 150C, 150D and the sliding between the slider body 110 and the slide rail 500

In this embodiment, two dustproof members 150A and 150B are arranged adjacent to the opening 113, and two dustproof members 150C and 150D are arranged on inner sides relatively away from the opening 113. In another implementation, two dustproof members 150A and 150B may alternatively be arranged only adjacent to the opening 113, or two dustproof members 150C and 150D may be arranged only on inner sides relatively away from the opening 113.

Figure 5:
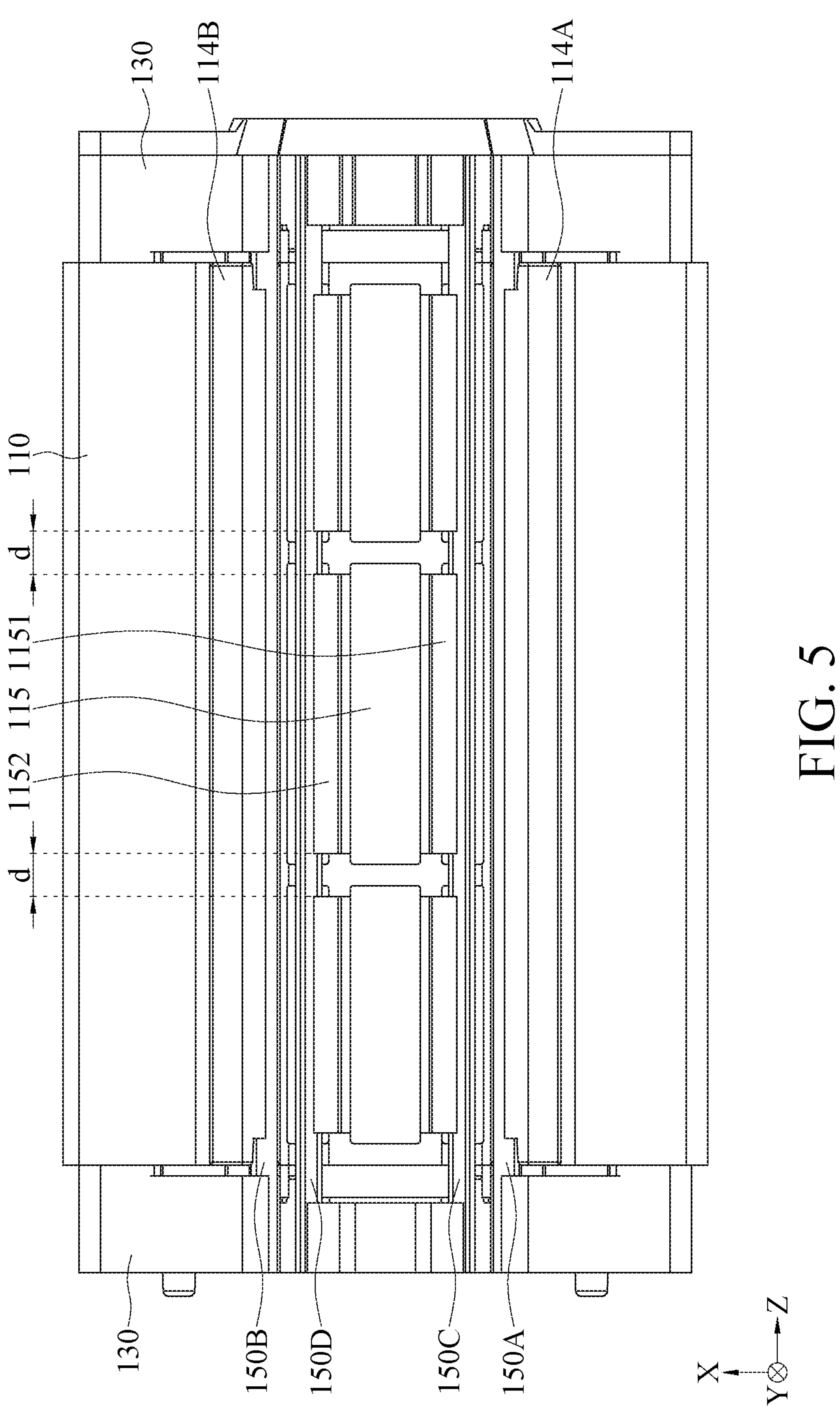
FIG. 5 is a bottom view of a linear transmission module according to a first embodiment.

Refer to FIG. 5. FIG. 5 is a bottom view of a linear transmission module according to a first embodiment; As shown in FIG. 5, each of the support portions 1151 and 1152 extends from a side of the end caps 130 to a side of the other end cap 130 at a plurality of intervals of d, but are not limited thereto. In another implementation, the support portions 1151 and 1152 continuously extend from a side of one of the end caps 130 to a side of the other of the end caps 130. In addition, in another implementation, the support portion 1152 may alternatively be arranged only at a middle section in the first direction Z, to prevent middle sections of the dustproof members 150C and 150D from sagging due to gravity.

Figure 6:
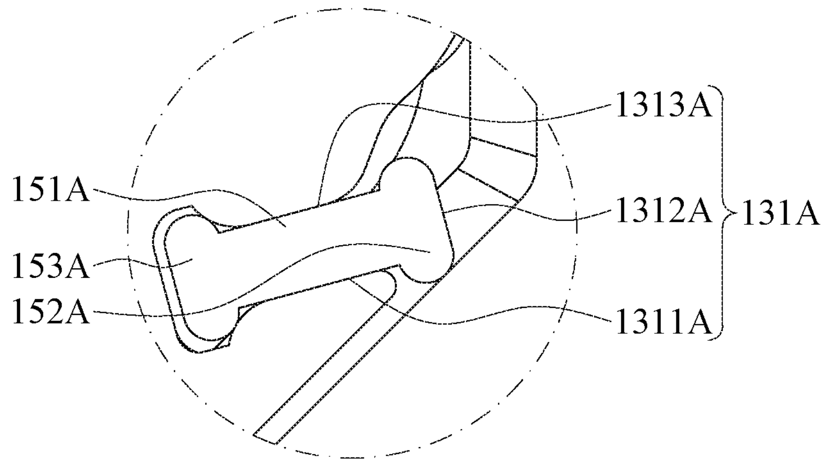
FIG. 6 is a schematic diagram of an assembly groove of a linear transmission module according to a second embodiment.

The assembly groove 131 and the dustproof member 150 may also have another implementation. FIG. 3 shows that the dimension of the dustproof member body 151A in the fourth direction D is smaller than the minimum distance between the abutting surface 1311A of the assembly groove 131A and the assembly surface 1313A in the fourth direction D, but is not limited thereto. Refer to FIG. 6. FIG. 6 is a schematic diagram of an assembly groove of a linear transmission module according to a second embodiment. In the second embodiment, a dimension of the dustproof member body 151A in the fourth direction D (a thickness dimension of the dustproof member body 151A) is substantially equal to a minimum distance between the abutting surface 1311A of the assembly groove 131A and the assembly surface 1313A in the fourth direction D. In this way, one side of the dustproof member body 151A abuts against the abutting surface 1311A, and the assembly surface 1313A abuts against the other side of the dustproof member body 151A. With such a structure, the dustproof member 150A can be clamped and assembled in the assembly groove 131A more stably.

Figure 7A:
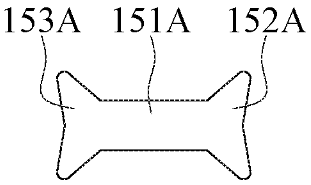
FIG. 7A is a schematic diagram of a dustproof member of a linear transmission module according to a third embodiment.
Figure 7B:
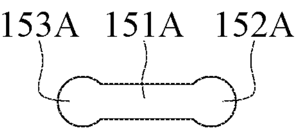
FIG. 7B is a schematic diagram of a dustproof member of a linear transmission module according to a fourth embodiment.

In addition, FIG. 3 shows the first contact portion 152A and the second contact portion 153A having a slightly elliptical cross-sectional shapes, but this application is not limited thereto. Refer to FIG. 7A and FIG. 7B. FIG. 7A is a schematic diagram of a dustproof member of a linear transmission module according to a third embodiment. FIG. 7B is a schematic diagram of a dustproof member of a linear transmission module according to a fourth embodiment. In the third embodiment, cross sections of the first contact portion 152A and the second contact portion 153A may be triangular as shown in FIG. 7A. Alternatively, in the fourth embodiment, cross sections of the first contact portion 152A and the second contact portion 153A may be in a shape such as a circle as shown in FIG. 7B. In another implementation, the cross sections may be in any shape such as a rectangle, provided that the first contact portion 152A and the second contact portion 153A are in a symmetrical shape.

Figure 8:
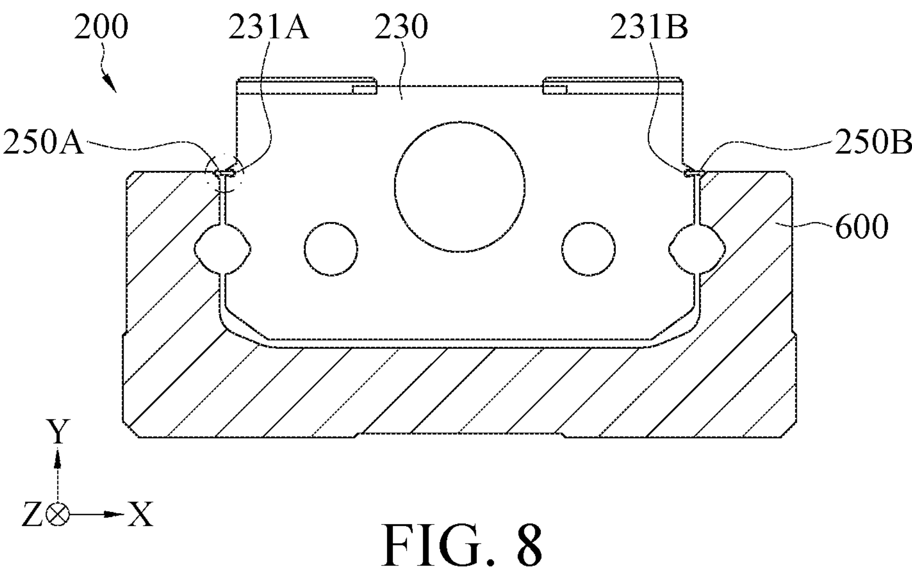
FIG. 8 is a front view of a linear transmission module used in a slide rail according to a fifth embodiment.
Figure 9:
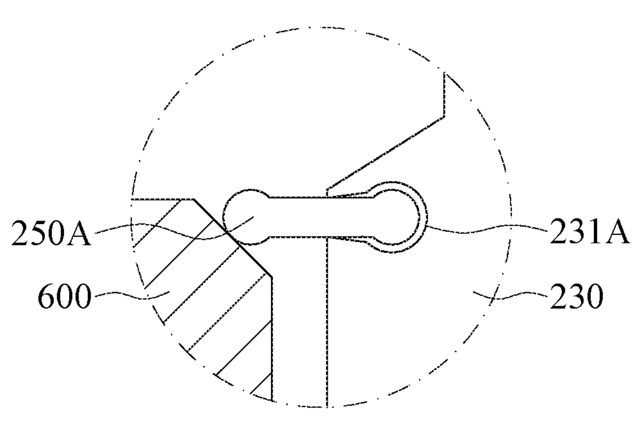
FIG. 9 is a partially enlarged view of the linear transmission module in FIG. 8.
Figure 10:
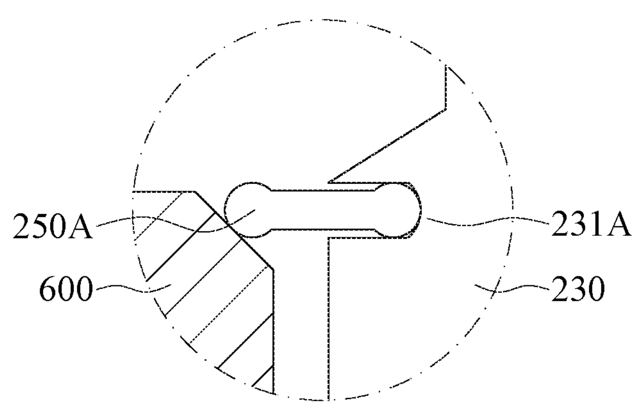
FIG. 10 is a schematic diagram of an assembly groove of a linear transmission module according to a sixth embodiment.

Refer to FIG. 8 to FIG. 10. FIG. 8 is a front view of a linear transmission module used in a slide rail according to a fifth embodiment. FIG. 9 is a partially enlarged view of the linear transmission module in FIG. 8. FIG. 10 is a schematic diagram of an assembly groove of a linear transmission module according to a sixth embodiment. In the fifth embodiment, the linear transmission module 200 may alternatively be used in the slide rail 600 of a monorail robot. In this embodiment, as shown in FIG. 8, the slide rail 600 of the monorail robot is, for example, a slide rail 600 with a U-shaped section. The linear transmission module 200 is placed at a concave position of the U-shaped slide rail 600 for sliding. In the fifth embodiment, the same structure as that in the first embodiment is not described again.

As shown in FIG. 8 and FIG. 9, in this embodiment, because the slide rail 600 is U-shaped with its opening facing upward, and the linear transmission module 200 is assembled from above in a middle concave position of the slide rail 600 for sliding, dust and the like falling from above can easily enter from a gap in which left and right sides of the slide rail 600 are in contact with the linear transmission module 200. Therefore, the two assembly grooves 231A and 231B are provided on an outer surface of the end cap 230 in the second direction X. Two ends of the dustproof members 250A and 250B are respectively assembled in the two assembly grooves 231A and 231B of the two end caps 230 in the first direction Z, thereby closing a gap between the linear transmission module 200 and the slide rail 600, and preventing dust or foreign matter from entering from above. As shown in FIG. 9, the assembly groove 231A is formed as a necked groove, so that the dustproof member 250A can be more stably assembled in the assembly groove 231A, but this application is not limited thereto. As shown in FIG. 10, in the sixth embodiment, the assembly groove 231A may alternatively be an opening groove with an entire inner surface extending flatly.

What is claimed is:

1. A linear transmission module, comprising:

a slider body, wherein a length direction is set as a first direction, a width direction is set as a second direction, a thickness direction is set as a third direction, and the first direction, the second direction, and the third direction are perpendicular to each other;

two end caps, respectively arranged at two opposite ends of the slider body in the first direction, wherein each of the end caps comprises at least two assembly grooves correspondingly arranged in the second direction, each of the assembly grooves extends through the end cap in the first direction, each of the assembly grooves comprises an abutting surface, a clamping portion, and an assembly surface, the clamping portion is respectively connected to the abutting surface and the assembly surface, the abutting surface and the assembly surface are opposite surfaces, and a minimum distance between the abutting surface and the assembly surface in a fourth direction is smaller than a maximum distance of the clamping portion in the fourth direction; and at least two dustproof members, extending in the first direction, wherein one end of each of the dustproof members in the first direction is assembled in the assembly groove of one of the end caps, the other end of each of the dustproof members in the first direction is assembled in the assembly groove of the other of the end caps, each of the dustproof members comprises a dustproof member body, a first contact portion, and a second contact portion, the first contact portion and the second contact portion are respectively located on two opposite sides of the dustproof member body that are perpendicular to the first direction, protrude from the dustproof member body in the fourth direction of the dustproof member body, and are in a symmetrical shape;

wherein a through groove running through the first direction is comprised inside the end cap, the through groove comprises two inner surfaces of the end cap in the second direction of the end cap, and the two assembly grooves are correspondingly arranged on the two inner surfaces of the end cap;

wherein a rail groove running through the first direction is provided inside the slider body, the rail groove comprises two slider body inner surfaces in the second direction of the slider body, and forms an opening in the third direction, the slider body further comprises two outer retainers, the two outer retainers are respectively arranged on two opposite slider body inner surface and are adjacent to the opening, each of the outer retainers comprises an accommodation groove running through in the first direction and corresponds to one of the assembly grooves, and when two opposite ends of each of the dustproof members are respectively assembled in one of the assembly grooves of the two end caps, a part of each of the dustproof members is accommodated in one of the accommodation groove.

2. The linear transmission module according to claim 1, wherein the at least two dustproof members are four dustproof members, the at least two assembly grooves are four assembly grooves, the slider body further comprises an inner retainer arranged on a side that is opposite to the opening in the rail groove in the slider body, the inner retainer comprises two support portions correspondingly arranged in the second direction, each of the support portions extends in the first direction, the two assembly grooves correspond to the two support portions and are arranged on the end caps, when two opposite ends of two of the dustproof members are respectively assembled in the assembly grooves corresponding to the support portions on the two end caps, the first contact portions of the two dustproof members respectively abut against the support portions; and when two opposite ends of the other two dustproof members are respectively assembled in the assembly grooves corresponding to the accommodation grooves on the two end caps, the first contact portions of the other two dustproof members are respectively correspondingly accommodated in the accommodation grooves.

3. The linear transmission module according to claim 1, wherein each of the support portions continuously extends from a side of one of the end caps to a side of the other end cap.

4. The linear transmission module according to claim 1, wherein each of the support portions extends from a side of one of the end caps to a side of the other end cap at a plurality of intervals.

5. The linear transmission module according to claim 1, wherein when the dustproof member is assembled in the assembly groove, the first contact portion is accommodated in the clamping portion, the dustproof member body abuts against the abutting surface, and the second contact portion is exposed from the assembly groove.

6. The linear transmission module according to claim 1, wherein a dimension of the dustproof member body in the fourth direction is smaller than the minimum distance between the abutting surface of the assembly groove and the assembly surface in the fourth direction.

7. The linear transmission module according to claim 1, wherein a dimension of the dustproof member body in the fourth direction is equal to the minimum distance between the abutting surface of the assembly groove and the assembly surface in the fourth direction.

8. The linear transmission module according to claim 7, wherein the assembly surface of the assembly groove protrudes toward the abutting surface and abuts against the dustproof member body of the dustproof member.

9. The linear transmission module according to claim 1, wherein the two assembly grooves are arranged on an outer surface of the end cap in the second direction.

10. The linear transmission module according to claim 1, wherein a hardness of the dustproof member body of each of the dustproof members is greater than a hardness of the first contact portion and a hardness of the second contact portion.

11. The linear transmission module according to claim 1, wherein cross sections of the first contact portion and the second contact portion are circular, elliptical, triangular, or rectangular.

* * * * *